United States Patent [19]

Stobbe

[11] 3,892,556

[45] July 1, 1975

[54] COMPOSITION AND METHOD FOR CONTROLLING WILD OATS

[76] Inventor: Elmer H. Stobbe, 97 Linacre Rd., Winnipeg, Manitoba, Canada

[22] Filed: Nov. 19, 1973

[21] Appl. No.: 417,313

[30] Foreign Application Priority Data

Dec. 4, 1972 Canada .................................. 157964

[52] U.S. Cl. .................................................. 71/111
[51] Int. Cl. ............................................... A01n 9/20
[58] Field of Search .............................. 71/111, 106

[56] References Cited

UNITED STATES PATENTS 2,906,614  9/1959  Hopkins et al. ........................ 71/111
3,712,805  1/1973  Yates et al. ............................ 71/111

*Primary Examiner*—James O. Thomas, Jr.

[57] ABSTRACT

Certain combinations of (a) 4-chloro-2-butynyl-m-chlorocarbanilate and (b) ethyl 2-N-benzoyl-N-(3,4-dichlorophenyl)-2-aminopropionate or certain analogs thereof, exhibit a synergistic level of herbicidal activity for the control of wild oats.

6 Claims, No Drawings

COMPOSITION AND METHOD FOR CONTROLLING WILD OAT

This invention relates to a composition comprising (a) 4-chloro-2-butynyl-m-chlorocarbanilate and (b) ethyl 2-N-benzoyl-N-(3,4-dichlorophenyl)-2-aminopropionate or certain analogs thereof, exhibiting a synergistic level of herbicidal activity for the control of wild oat and to a method for controlling wild oat using said composition.

Wild oat (*Avena fatua*) is a major world-wide weed problem that is a widespread and abundant competitor in cereal grain fields. Estimates vary as to the annual economic loss resulting from wild oat infestations; however, the loss in Canada alone has been set as high as $100 million per year.

One herbicide that is available for controlling wild oat is 4-chloro-2-butynyl-m-chlorocarbanilate, commonly known and hereinafter referred to as barban. At appropriate, relatively low, dosages, it effectively inhibits growth of wild oat plants without significant injury to cereal grain (wheat, barley) plants. However, if suffers from serious drawbacks: it is effective only if it is applied to the wild oat while the plants are in the 2-leaf stage of development. If it is applied at a later stage of the plants' development, its level of activity against the wild oat plants is significantly decreased. Thus, when barban is to be used, the farmer must carefully watch the growth of the wild oat plants and apply barban at the appropriate critical stage in its development. Weather conditions can present a serious problem during this critical stage since, if it is raining or the ground is wet, it may be difficult or impossible to apply the barban to the wild oat plants at the critical time. As a further complication, if the weather conditions are such that one or more thaws in a period of cold weather occur, part of the wild oat seeds germinate during each thaw, giving rise to a wild oat infestation exhibiting multiple stages of development. When this occurs, multiple applications of barban are necessary since each application effectively controls only those plants in the 2-leaf stage. Multiple applications are undesirable, in that they require more herbicide and additional work and lost time for the farmer; they also require that the farmer watch for multiple 2-leaf stages in the wild oat.

Another herbicide for controlling wild oats in cereal grain plantings is available: ethyl 2-N-benzoyl-N-(3,4-dichlorophenyl)-2-aminopropionate, commonly known and hereinafter referred to as benzoylprop ethyl. It is a more flexible herbicide, being effective when applied to wild oat plants within the 3-leaf to 6-leaf stages. However, for it to be effective, it must be used in relatively large dosages — for example, 1 to 1 ¼ pounds per acre.

Surprisingly, it has now been found that wild oat can be effectively controlled at any stage of its development by applying a combination of barban and benzoylprop ethyl at significantly lower dosage rates than would be required for either compound alone. Testing at reduced dosage levels at which complete kills do not mask the relative effectiveness of the herbicides indicates that such a combination exhibits synergistic level of herbicidal activity with respect to wild oats. Even more surprising is the fact that, while the herbicidal activity of the combination is increased with respect to wild oat, there is no corresponding increase in the effect of the combination upon cereal grains, so that the combination can be used safely in fields planted with cereal grain crops.

In place of benzoylprop ethyl, ethyl 2-N-benzoyl-N-(3-chloro-4-fluorophenyl)-2-aminopropionate or isopropyl 2-N-benzoyl-N-(3-chloro-4-fluorophenyl)-2-aminopropionate can be used in combination with barban.

This discovery makes it possible to control wild oat at any stage of its development by post-emergent, foliar application to the wild oat. Wild oat can be controlled even in cereal grain by application of from 5 to 24 oz per acre of a composition comprising as active ingredients from 1 to 4 parts by weight barban and from 4 to 20 parts by weight benzoylprop ethyl.

A preferred composition that has a high degree of herbicidal activity at relatively low dosage rates comprises from 1 to 2 oz barban and from 4 to 12 oz benzoylprop ethyl. This composition is preferably applied at a rate of from 5 to 14 oz per acre.

Barban can be readily prepared as taught in U.S. Pat. No. 2,906,614. Benzoylprop ethyl, ethyl 2-N-benzoyl-N-(3-chloro-4-fluorophenyl)-2-aminopropionate and isopropyl 2-N-benzoyl-N-(3-chloro-4-fluorophenyl)-2-aminopropionate can be prepared according to the method taught in U.S. Pat. No. 3,598,859.

FORMULATION OF THE HERBICIDE

The herbicides of this invention may be conveniently formulated using an inert, agriculturally acceptable carrier. The term "carrier" as used herein means a solid or fluid material, which may be inorganic or organic and of synthetic or natural origin, with which the active compounds are mixed or formulated to facilitate their application to the plants to be treated, or its storage, transport or handling.

The following list of suitable carriers is included for purposes of illustration and is not intended to be exhaustive.

Typical solid carriers include natural and synthetic clays and silicates, for example, natural silicas such as diatomaceous earths and aluminum silicates, for example, kaolinites, montmorillonites, and micas. Typical fluid carriers are ketones, for example, methylcyclohexanone, aromatic hydrocarbons, for example, methylnaphthalenes, petroleum fractions, such as, for example, petroleum xylenes and light mineral oils, and chlorinated hydrocarbons, for example, carbon tetrachloride. Mixtures of liquids are often suitable.

One or more surface active agents and/or stickers can be included in the formulation. The surface active agent may be an emulsifying agent or a dispersing agent or a wetting agent; it may be nonionic or ionic. Any of the surface-active agents usually applied in formulating herbicides or insecticides may be used. Examples of suitable surface-active agents are the sodium or calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and-/or propylene oxide; sulfates or sulfonates of these condensation products, alkali or akaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate; and polymers of ethylene oxide and copolymers of ethylene oxide and propylene oxide.

Aqueous dispersions and emulsions, for example, compositions obtained by diluting a wettable powder or a concentrate according to the invention with water, also lie within the scope of the present invention. The said emulsions may be of the water-in-oil or of the oil-in-water type, and may have a thick 'mayonnaise'-like consistency.

The compositions of this invention are applied to the wild oat plants in a conventional manner. The dust and liquid compositions may be conveniently applied by the use of power-dusters, boom and hand sprayers, and spraydusters. The compositions can also be applied from airplanes as a dust or spray because of the effectiveness of the compositions at low dosages.

Post-emergent use of the herbicides

EXAMPLE 1 - Greenhouse experiment

Wild oat was seeded in gallon tin cans (6 inches in diameter) and, after sprouting, the seedlings were thinned to 5 uniform plants per can. Supplementary light of approximately 2,000 ft candles was added until the time of herbicide application. In all the tests, the herbicide or herbicides were applied as a spray comprising formulated benzoylprop ethyl and barban. The benzoylprop ethyl formulation contained 20% by weight active ingredient (Endaven Herbicide supplied by Shell Canada Ltd.) and the barban formulation contained 12½% by weight active ingredient (Carbyne Herbicide supplied by Gulf Oil Co.). The spray volumes were adjusted to be equivalent to an application rate of four gallons of solution per acre.

After the spray was applied, no supplementary light was added. The plants were harvested 3 weeks after the application of the herbicide or herbicides and dried and weighed.

Treatments with each herbicide alone and in combination were made when the wild oat was in the 2-leaf and the 4-leaf stages. The results of the tests are shown in Tables I and II below. Table I shows the average weight in grams per 5 plants of wild oat in the 2-leaf stage at each dosage. Table II shows the same information for wild oat in the 4-leaf stage.

TABLE I

WILD OAT IN 2-LEAF STAGE

| Benzoylprop ethyl, ounces/acre | Barban, ounces/acre | | | |
|---|---|---|---|---|
| | 0 | 1 | 2 | 4 |
| 0 | 5.66 (control) | 5.55 | 3.44 | 0.71 |
| 5 | 5.14 | 2.65 | 0.92 | 0.38 |
| 10 | 4.53 | 2.10 | 0.45 | 0.43 |
| 20 | 2.66 | 0.96 | 0.30 | 0.30 |

TABLE II

WILD OAT IN 4-LEAF STAGE

| Benzoylprop ethyl, ounces/acre | Barban, ounces/acre | | | |
|---|---|---|---|---|
| | 0 | 1 | 2 | 4 |
| 0 | 6.00 (control) | 3.88 | 2.13 | 1.20 |
| 5 | 4.09 | 1.86 | 1.16 | 0.93 |
| 10 | 3.13 | 1.57 | 1.07 | 0.87 |
| 20 | 2.48 | 1.16 | 0.92 | 0.78 |

EXAMPLE 2 - Field test

Fergus and conquest barley and Neepawa wheat were seeded for field testing of the combination of benzoylprop ethyl and Barban and of each separately. The spray formulations used were the same as in Example 1. The spray treatments were applied using 6500.67 nozzles at a pressure of 45 pounds per square inch and the nozzle angle pointing forward at 45°. There were 4 replications of each test. The results are summarized in Tables III, IV, and V below, showing the effectiveness of the formulation tested rated on the basis of a 0 to 9 scale, 0 rating indicating no effect, 9 indicating death of the seedlings.

TABLE III

WILD OAT CONTROL IN FERGUS BARLEY - BARLEY IN 5-LEAF STAGE,
WILD OAT IN 4-LEAF STAGE AT TIME OF HERBICIDE APPLICATION

| Benzoylprop ethyl, ounces/acre | Barban, ounces/acre | | | |
|---|---|---|---|---|
| | 0 | ½ | 1 | 2 | 4 |
| 0 | 0 (control) | — | 2 | 4 | 5 |
| 2 | — | 4 | 3 | 6 | — |
| 4 | — | 4 | 5 | 6 | — |
| 8 | 3 | 7 | 5 | 8 | — |
| 12 | 5 | 7 | 7 | 8 | — |
| 16 | 6 | — | — | — | — |
| 20 | 5 | — | — | — | — |

TABLE IV

WILD OAT CONTROL IN CONQUEST BARLEY - BARLEY IN 4-LEAF STAGE,
WILD OAT IN 3-LEAF STAGE AT TIME OF HERBICIDE APPLICATION

| Benzoylprop ethyl, ounces/acre | Barban, ounces/acre | | | |
|---|---|---|---|---|
| | 0 | ½ | 1 | 2 | 4 |
| 0 | 0 (control) | — | 5 | 6 | 5 |
| 2 | — | 5 | 4 | 6 | — |
| 4 | — | 5 | 5 | 7 | — |
| 8 | 4 | 6 | 6 | 8 | — |
| 12 | 4 | 4 | 5 | 7 | — |
| 16 | 4 | — | — | — | — |
| 20 | 6 | — | — | — | — |

TABLE Va

WILD OAT CONTROL IN NEEPAWA WHEAT - WILD OAT IN 1½-LEAF STAGE AT TIME OF HERBICIDE APPLICATION

| Benzoylprop ethyl, ounces/acre | Barban, ounces/acre | | | |
|---|---|---|---|---|
| | 0 | ½ | 1 | 2 | 4 |
| 0 | 0 (control) | — | 3 | 3 | 5 |
| 2 | — | 2 | 4 | 4 | — |
| 4 | 1 | 4 | 4 | 4 | — |
| 8 | 1 | 5 | 6 | 7 | — |
| 12 | 5 | 5 | 6 | 8 | — |
| 16 | 4 | — | — | — | — |

TABLE Vb

WILD OAT CONTROL IN NEEPAWA WHEAT - WILD OAT IN 3-4-LEAF STAGE AT TIME OF HERBICIDE APPLICATION

| Benzoylprop ethyl, ounces/acre | Barban, ounces/acre | | | |
|---|---|---|---|---|
| | 0 | ½ | 1 | 2 | 4 |
| 0 | 0 (control) | — | 4 | 4 | 6 |
| 2 | — | 3 | 4 | 6 | — |
| 4 | 3 | 3 | 4 | 6 | — |
| 8 | 5 | 6 | 6 | 7 | — |
| 12 | 6 | 6 | 7 | 7 | — |
| 16 | 6 | — | — | — | — |

TABLE Vc

WILD OAT CONTROL IN NEEPAWA WHEAT - WILD OAT TILLERING, APPROXIMATELY 8 INCHES TALL AT TIME OF HERBICIDE APPLICATION

| Benzoylprop ethyl, ounces/acre | Barban, ounces/acre | | | | |
|---|---|---|---|---|---|
| | 0 | ½ | 1 | 2 | 4 |
| 0 | 0 (control) | — | 3 | 1 | 3 |
| 2 | — | 6 | 6 | 6 | — |
| 4 | 7 | 6 | 6 | 7 | — |
| 8 | 8 | 7 | 7 | 7 | — |
| 12 | 8 | 8 | 8 | 8 | — |
| 16 | 8 | — | — | — | — |

The data tabulated above show clearly the synergistic effect of the combination of herbicides on wild oat.

The invention claimed is:

1. A composition for the control of wild oats comprising a herbicidally effective amount of:
   a. 1 to 4 parts by weight 4-chloro-2-butynyl-m-chlorocarbanilate,
   b. 4 to 20 parts by weight ethyl 2-N-benzoyl-N-(3,4-dichlorophenyl)-2-aminopropionate, ethyl 2-N-benzoyl-N-(3-chloro-4-fluorophenyl)-2-aminopropionate, or isopropyl 2-N-benzoyl-N-(3-chloro-4-fluorophenyl)-2-aminopropionate and
   c. an inert, agriculturally acceptable carrier.

2. A composition as defined in claim 1 wherein component (b) is ethyl-2-N-benzoyl-N-(3,4-dichlorophenyl)-2-aminopropionate.

3. A composition as defined in claim 1 comprising 1 to 2 parts by weight 4-chloro-2-butynyl-m-chlorocarbanilate and 4 to 12 parts by weight ethyl 2-N-benzoyl-N-(3,4-dichlorophenyl)-2-aminopropionate.

4. A method for combatting wild oat which comprises applying to the wild oat plants an effective amount of the composition as defined in claim 1.

5. A method for combatting wild oat which comprises applying to a cereal grain crop infested therewith from 5 to 24 ounces per acre of the composition as defined in claim 2.

6. A method for combatting wild oat which comprises applying to a cereal grain crop infested therewith from 5 to 14 ounces per acre of the composition as defined in claim 3.

* * * * *